US009843853B2

(12) United States Patent
Hirsch et al.

(10) Patent No.: US 9,843,853 B2
(45) Date of Patent: Dec. 12, 2017

(54) POWER CONTROL FOR BATTERY POWERED PERSONAL AREA NETWORK DEVICE SYSTEM AND METHOD

(71) Applicant: BRAGI GmbH, München (DE)

(72) Inventors: Eric Christian Hirsch, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/245,031

(22) Filed: Aug. 23, 2016

(65) Prior Publication Data

US 2017/0064433 A1    Mar. 2, 2017

Related U.S. Application Data

(60) Provisional application No. 62/211,767, filed on Aug. 29, 2015.

(51) Int. Cl.
| | | |
|---|---|---|
| *H04R 1/10* | (2006.01) | |
| *H02J 7/00* | (2006.01) | |
| *H02J 7/02* | (2016.01) | |
| *H04R 1/02* | (2006.01) | |
| *H04W 52/02* | (2009.01) | |

(Continued)

(52) U.S. Cl.
CPC ............ *H04R 1/1041* (2013.01); *H02J 7/007* (2013.01); *H02J 7/025* (2013.01); *H02J 50/10* (2016.02); *H04R 1/028* (2013.01); *H04R 1/1025* (2013.01); *H04W 52/0225* (2013.01); *H04W 52/0229* (2013.01); *H04W 52/0245* (2013.01); *H04M 1/6066* (2013.01); *H04R 2420/07* (2013.01); *Y02B 60/50* (2013.01)

(58) Field of Classification Search
CPC .... H04R 1/1041; H04R 1/1025; H04R 1/028; H04R 2420/07; H04W 52/0225; H02J 7/025; H02J 7/007; H02J 50/10; H04M 1/6066
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Brenda Bernardi
(74) *Attorney, Agent, or Firm* — Goodhue, Coleman & Owens, P.C.

(57) ABSTRACT

A system and method for managing wireless earpieces. Circuitry of the wireless earpieces are powered utilizing a high power mode in response to detecting a magnetic field is not applied to one or more of the wireless earpieces. The power sent to the circuitry of the wireless earpieces is altered to a low power mode in response to detecting the magnetic field is applied to one or more of the wireless earpieces.

21 Claims, 5 Drawing Sheets

(51) Int. Cl.
*H02J 50/10* (2016.01)
*H04M 1/60* (2006.01)

(56) References Cited

U.S. PATENT DOCUMENTS

| | | | |
|---|---|---|---|
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 8,891,800 B1* | 11/2014 | Shaffer | H04R 1/1025 379/437 |
| 9,013,145 B2* | 4/2015 | Castillo | H02J 7/0044 320/103 |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2006/0258412 A1* | 11/2006 | Liu | H02J 7/0044 455/575.2 |
| 2008/0254780 A1 | 10/2008 | Kuhl et al. | |
| 2008/0298606 A1* | 12/2008 | Johnson | H04R 1/1091 381/74 |
| 2012/0309453 A1 | 12/2012 | Maguire | |
| 2014/0004912 A1 | 1/2014 | Rajakarunanayake | |
| 2014/0270227 A1* | 9/2014 | Swanson | H04R 1/1016 381/74 |
| 2015/0245127 A1* | 8/2015 | Shaffer | H04R 1/1025 381/380 |
| 2016/0073189 A1* | 3/2016 | Linden | H04R 1/1033 381/74 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People © BRAGI—Prototypes (Jun. 26, 2014).
BRAGI Update—Office Tour, Tour to China, Tour to CES (Dec. 11, 2014).

(56) References Cited

OTHER PUBLICATIONS

BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update-Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2. 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP16/70245 (Nov. 16, 2016).

\* cited by examiner

POWER CONTROL FOR BATTERY POWERED PERSONAL AREA NETWORK DEVICE SYSTEM AND METHOD

PRIORITY STATEMENT

This application claims priority to U.S. Provisional Patent Application No. 62/211367, filed Aug. 29, 2016, hereby incorporated by reference in its entirely.

BACKGROUND

I. Field of the Disclosure

The present invention relates to wireless electronics and battery systems. More specifically, but not exclusively, the present invention relates to wireless earpieces that manage and extend battery life.

II. Description of the Art

The growth of wearable devices is increasing exponentially. This growth is fostered by the decreasing sizes of microprocessors, circuit boards, chips, and other components. Wearable devices are necessarily dependent upon their batteries in order to complete their desired function. The overall utility of wearable devices is directly proportional to the battery life of the devices. If the battery life is poor, the user interface and user experiences suffers as too much time and attention are required for retrieving the device, recharging or replacing the battery, and repositioning the wearable device. Operation and conservation of the battery life of the wearable device may be further complicated if the there is no inclusion of an on/off button or switch to conserve precious battery life.

SUMMARY OF THE DISCLOSURE

The illustrative embodiments provide a system and method for managing wireless earpieces. Circuitry of the wireless earpieces are powered utilizing a high power mode in response to detecting a magnetic field is not applied to one or more of the wireless earpieces. The power sent to the circuitry of the wireless earpieces is altered to a low power mode in response to detecting the magnetic field is applied to one or more of the wireless earpieces.

Another embodiment provides a wireless earpiece. The wireless earpiece includes circuitry for operating the wireless earpiece. The wireless earpiece also includes a battery for powering the circuitry of the wireless earpiece. The wireless earpiece further includes a reed switch connecting the battery to the circuitry. The reed switch connects the circuitry to the battery when a magnetic field is not detected. The reed switch disconnects the circuitry from the battery when a magnetic field is detected.

Yet another embodiment provides a wireless earpiece comprising a processor for executing a set of instructions and a memory for storing the set of instructions. The set of instructions are executed to power circuitry of the wireless earpiece in a high power mode utilizing an onboard battery in response to a reed switch not detecting a magnetic field and powering the circuitry to a low power mode in response to detecting the magnetic field is applied to the reed switch.

According to another aspect, a smart case including a smart case housing, a first receptacle for receiving a left earpiece disposed within the smart case housing, a second receptacle for receiving a right earpiece disposed within the smart case housing, and a first interface associated with the first receptacle for electrically connecting the smart case to the left earpiece. The smart case further includes a second interface associated with the second receptacle for electrically connecting the smart case to the right earpiece, and an intelligent control disposed within the smart case housing and operatively connected to the first interface and the second interface. The smart case may include at least one manual input operatively connected to the intelligent control. The smart case may include at least one display operatively connected to the intelligent control. The smart case may include a display that is moveably connected to the smart case housing such that the display transitions from a first position to a second position.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

The illustrative embodiments provide a system, method, and wireless earpieces for managing and preserving battery life. The wireless earpieces may interact with a smart case to perform various actions. For example, the smart case may be utilized to preserve the battery life of the wireless earpieces by interacting with the wireless earpieces while in a low power mode or state. In addition, the smart cases may ensure that the wireless earpieces are charged to a desired level. Charging may be performed utilizing contact or wirelessly (e.g., inductive charging). The smart case may communicate with the wireless earpieces through physical interactions (e.g., magnetic contact points, physical switches, etc.) or through wireless connections, standards, or protocols (e.g., near field communications, Bluetooth, Wi-Fi, etc.). The wireless earpieces may upload, synchronize, or store biometric and performance data associated with the wireless earpieces and/or associated user to the smart case.

In one embodiment, a reed switch may be utilized in the wireless earpieces to activate and deactivate each of the wireless earpieces. The reed switch is an electrical switch operated by an applied magnetic field. The magnetic field may be provided by a magnet of the smart case thereby turning the wireless earpieces on and off. The integration of the reed switches in the wireless earpieces may reduce the need for costly device components or interfaces. As a result, the weight and footprint of the wireless earpieces may be reduced significantly while increasing the ease of use for the users of the wireless earpieces.

Figure 1:
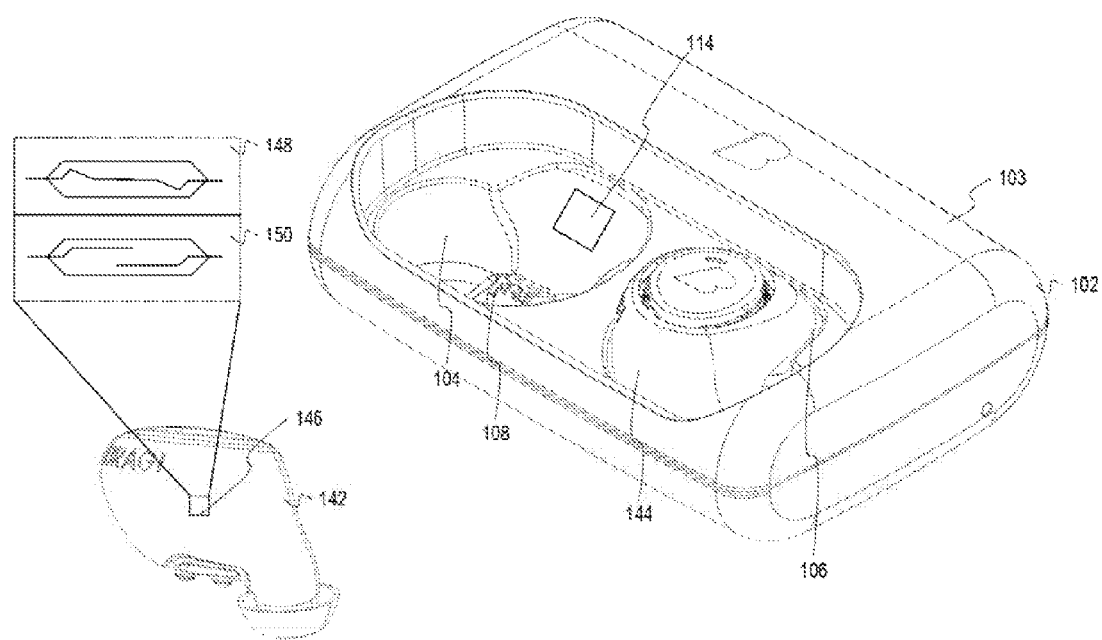
FIG. 1 is a pictorial representation of a smart case and wireless earpieces in accordance with an illustrative embodiment.
Figure 2:
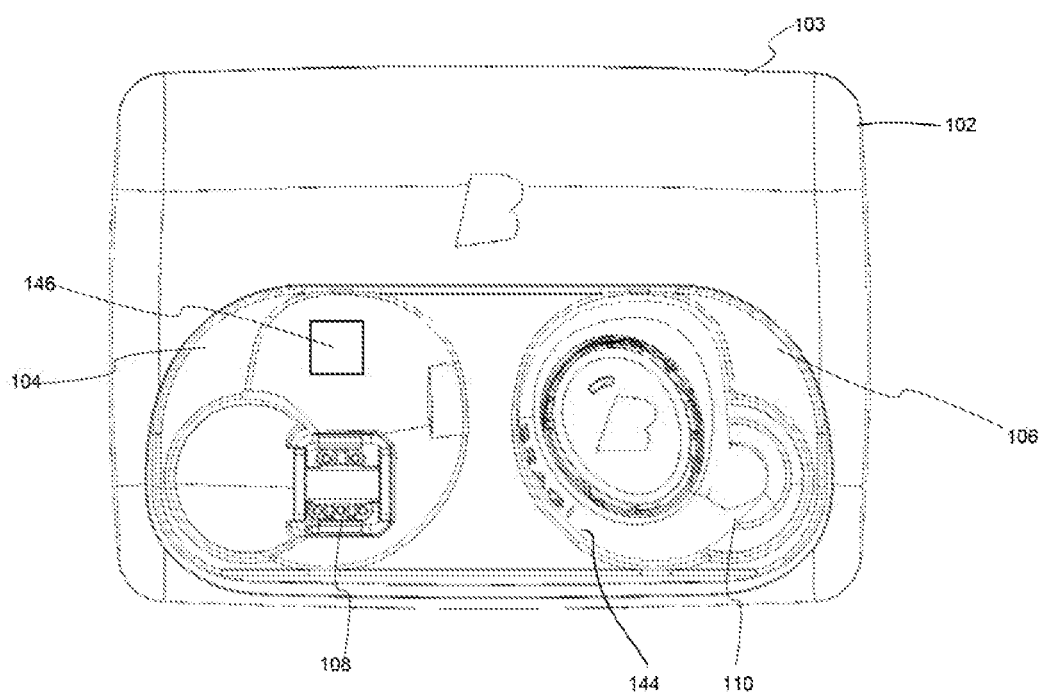
FIG. 2 is a top view of the smart case of FIG. 1 in accordance with an illustrative embodiment.
Figure 3:
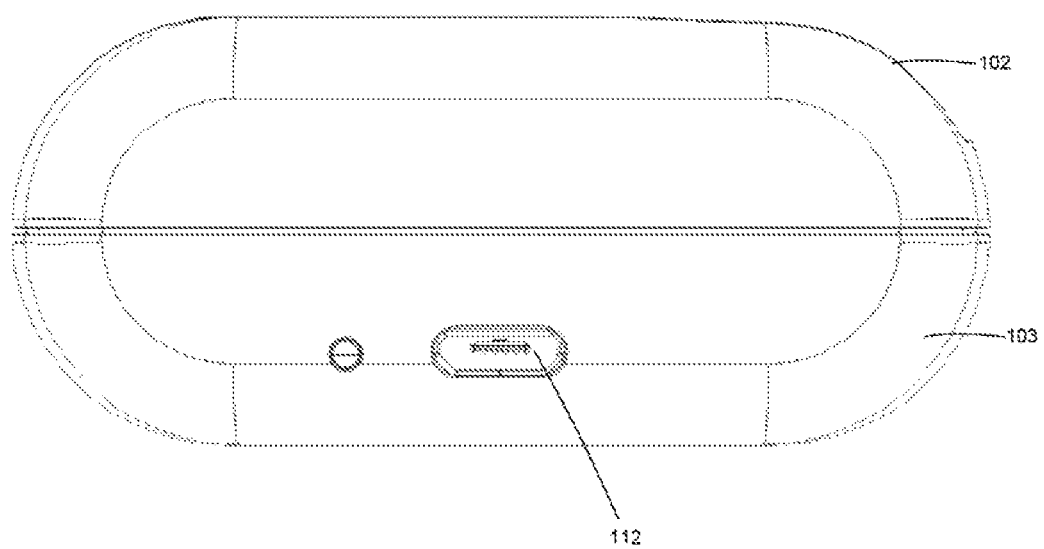
FIG. 3 is a side view of the smart case of FIG. 1 in accordance with an illustrative embodiment.

Turning now to FIGS. 1-3, these figures show a pictorial representation of a smart case 102 and wireless earpieces 142, 144 in accordance with an illustrative embodiment. The smart case 102 may be an open or enclosed case for securing, charging, and managing the wireless earpieces 142, 144. The wireless earpieces 142, 144 may be referred to as a pair (wireless earpieces) or singularly (wireless earpiece). The description may also refer to components and functionality of each of the wireless earpieces 142, 144 collectively or individually. In one embodiment, the wireless earpieces 142, 144 include a set of left and right ear pieces configured to fit into a user's ears. The wireless earpieces 142, 144 may be configured to play music or audio, receive and make phone calls or other communications, read user biometrics and actions (e.g., heart rate, motion, sleeping, etc.).

In another embodiment, the wireless earpieces 142, 144 may represent wireless devices that may be ingested or implanted into a user. For example, the smart case 102 may be configured to work with an endoscopic pill, pacemaker, tracking device, contact lenses, oral implants, bone implants, artificial organs, or so forth. The smart case 102 may act as a logging tool for receiving information, data, or measurements made by the wireless devices. For example, the smart case 102 may be attached to a belt or worn by the user to download data from the wireless device(s) in real-time. As a result, the smart case 102 may be utilized to store, charge, and synchronize data for the wireless earpieces 142, 144 in any number of embodiments.

The smart case 102 encloses a battery, and various other circuitry (not shown). The battery of the smart case 102 may be utilized to charge the wireless earpieces 142, 144 through direct contact or wirelessly. As a result, the smart case 102 may net as a custom charger for ensuring the proper power management and functionality of the wireless earpieces 142, 144. For example, the battery of the smart case 102 may be utilized to charge the wireless earpieces 142, 144 any number of times before the smart case 102 and corresponding battery may require charging. In one embodiment, the smart case 102 may include one or More solar panels, or surfaces configured to charge the smart case 102 utilizing ambient or direct sunlight. The smart case 102 ensures that the duty cycle of the wireless earpieces 142,144 are maximized by properly maintaining power levels. For example, the smart case 102 may keep the wireless earpieces 142, 144 fully charged during a time period of inactivity, such as before being purchased (e.g., on a shelf or as part of inventory) or once purchased.

In one embodiment, the smart case 102 include a frame 103. The frame 103 is a support structure for the components of the smart case 102 and may be formed of a rigid plastic, polymer, or other similar material. However, any number of other suitable materials, such as composites, rubber, wood, metal, or so forth, may be utilized. The flame 103 defines receptacles 104, 106 that are configured to receive the wireless earpieces 142, 144, respectively. In one embodiment, the receptacles 104, 106 are shaped to fit the external size, shape, and configuration of the wireless earpieces 142, 144.

As result, an interference fit may secure the wireless earpieces 142, 144 within the frame 103 while the smart case 102 is being moved or otherwise utilized. In one embodiment, the smart case 102 may include a hinged, magnetic, sleeve, or snap on lid or cover that may cover the wireless earpieces 142, 144 when positioned within the receptacles 104, 106 of the smart case 102. For example, the cover may make the smart case 102 waterproof and further secure the wireless earpieces 142, 144. In another embodiment, the smart case 102 may also include a removable cover (e.g., neoprene, zip up, snapping, etc.). In yet another embodiment, the cover encases a screen, such as a touch screen. The screen may roll, bend or adapt to the shape and configuration of the smart case 102. The touch screen may also be transparent. The screen may be movably connected to the to the smart case to transition from a first position to a second position by sliding, gliding or through other movement.

The smart case includes interfaces 108, 110 within the receptacles 104, 106. The interfaces 108, 110 are hardware interfaces for electrically connecting the wireless earpieces 142, 144 to the smart case 102. The interfaces 108, 110 may include any number of contact points, busses, wires, or other physical connectors for interfacing the wireless earpieces 142, 144, with the smart case 102. The interfaces 108, 110 may alternatively include inductive chargers for charging the wireless earpieces 142, 144. In one embodiment, the interfaces 108, 110 are magnetic for automatically coupling with contact points or interfaces of the wireless earpieces 142, 144. In another embodiment, the interfaces 108, 110 may represent male (or alternatively female) connectors for interfacing with the wireless earpieces 142, 144, such as micro-USB, or other developing miniature external connectors. The interfaces 108, 110 may be utilized to charge the wireless earpieces 142, 144. Wireless charging is also contemplated utilizing an inductive charger integrated in the smart case 102 or other charging devices compatible with the wireless earpieces 142, 144. The interfaces 108, 110 may also be utilized to synchronize data between the wireless earpieces 142, 144.

In one embodiment, the interfaces 108, 110 may each include a magnet that activates the corresponding reed switch (i.e., reed switch 146 described below) to power off or initiate a low power mode (e.g., lower power state or mode) for one or both of the wireless earpieces 142, 144 when one or more of the wireless earpieces 142, 144 are placed within the receptacles 104, 106. In another embodiment, the wireless earpieces 142, 144 and the smart case 102 may interact to control a device reset function For example, the wireless earpieces 142, 144 may synchronize captured data with the smart case 102 before moving to a low power mode in anticipation of being charged. A switch may be activated mechanically, magnetically, inductively, electrically, or wirelessly to move the wireless earpieces 142, 144 to a low power mode in anticipation of being charged. Control of the wireless earpieces 142, 144 may be independent for each of the wireless earpieces 142, 144, subject to control one of the wireless earpieces designated as a master device, controlled by the smart case, or may be shared between devices.

The smart case 102 may also include a port 112. The port 112 may be utilized to interface with the smart case 102. For example, the port 112 may be utilized with a connector to charge the battery of the smart case 102. The port 112 may also be utilized to download or upload data stored by the smart case 102 that may have previously been stored in the wireless earpieces 142, 144. The port 112 may be a miniaturized port, such as USB Type C, micro-USB, or other miniaturized port suitable for connecting to another electronic device, such as a well charger, desktop computer, laptop, or wireless device (e.g., smart phone, tablet, etc.). In another embodiment, the smart case 102 may include a dedicated port for charging, such as for receiving a male direct-current (DC) connector.

In one embodiment, the interfaces, 108, 110 or another portion of the smart case 102 as well as the wireless earpieces 142, 144 may include a near field communication (NFC) chip for communications. For example, NFCs may be utilized to determine the wireless earpieces 142, 144 are proximate the smart case 102 for performing power management as is herein described. NFC may also be utilized to identify the wireless earpieces 142, 144 associated with a particular smart case 102. In other embodiments, different communications protocols (e.g., Bluetooth, Wi-Fi, etc.), standards, or passive readers (e.g., radio frequency identification tags, etc.) may be utilized for the wireless earpieces 142, 144 to communicate with the smart case 102. For example, the wireless earpieces 142, 144 may initiate a change in a power state in response to being placed in or near the smart case 102. The smart case 102 may be programmed with a threshold distance (e.g., 10 cm, 1 foot, etc.) to determine when the wireless earpieces 142, 144 are proximate the smart case 102 or may rely on the inherent maximum communications distances of the wireless standard or protocol being utilized (e.g., NFC, RFID, etc.). In another embodiment, biometric readings, such as heart beat or temperature may be utilized by the wireless earpieces 142, 144 and smart case 102 to alter the power mode or status of the wireless earpieces 142, 144, as well as the smart case 102 (e.g., may be placed in a low power mode). For example, if the wireless earpieces 142, 144 are near the smart case 102 and no heart beat is detected, the smart case 102 may send a command for the wireless earpieces 142, 144 to shut themselves down or enter a low power mode with minimum functionality. In one embodiment, power to onboard sensory arrays may be terminated and only essential functions remain on. For example, in the low power mode allows charging of the wireless earpieces 142, 144 and/or smart case 102 and uploads/downloads to the wireless earpieces 142, 144 while in the low power mode.

The wireless earpieces 142, 144 may each include a reed switch 146. The reed switch 146 may operate in a closed mode 148 when no magnetic field is present or in an open mode 150 when a magnetic field is present. The magnetic field may be supplied by one or more magnets of the smart case, such as magnet 114. As a result, the reed switch 146 may be in the closed mode 148 when outside the smart case 102 and in the open mode 150 when in the smart case 102.

In one embodiment, the magnet 114 may be integrated in a sidewall of the receptacle 104. Each of the receptacles 104, 106 may include magnets for the wireless earpieces 142, 144. As a result, proximity to the magnet 114 and reed switch 146 may engage the reed switch 146 to the open mode 150. As a result, the wireless earpiece 142 may be charged by the smart case. Removal of the wireless earpiece 142 disengages the reed switch 146 resulting in the wireless earpiece 142 functioning under its own power.

In another embodiment, the magnet 114 may be integrated in the interface 108. For example, the interface 108 may include magnetic contacts that engage the reed switch 146. The reed switch 146 may be positioned anywhere on or within the wireless earpiece 142. Similarly, the magnet 114 may be positioned anywhere within the smart case 102 (or integrated with any component) that allows the magnet 114 to interact with the reed switch 146 when the wireless earpiece 142 is seated within the receptacle 104. The case may have at least one button 119 or other manual input. The button may be touch sensitive, lighted, or mechanical. There also may be a light such as a LED in that location.

In another embodiment, each of the wireless earpieces 142, 144 may include a magnet so that the wireless earpieces 142, 144 may be positioned together to turn off the wireless earpieces 142, 144 when not in use. For example, the magnets and reed switches may be positioned to simultaneously deactivate the wireless earpieces 142, 144. The magnets may also serve another purpose in allowing the wireless earpieces 142, 144 to be stuck to metal objects (e.g., desk, refrigerator, decorations, etc.) when not in use to prevent the wireless earpieces 142, 144 from being dropped or lost.

Figure 4:
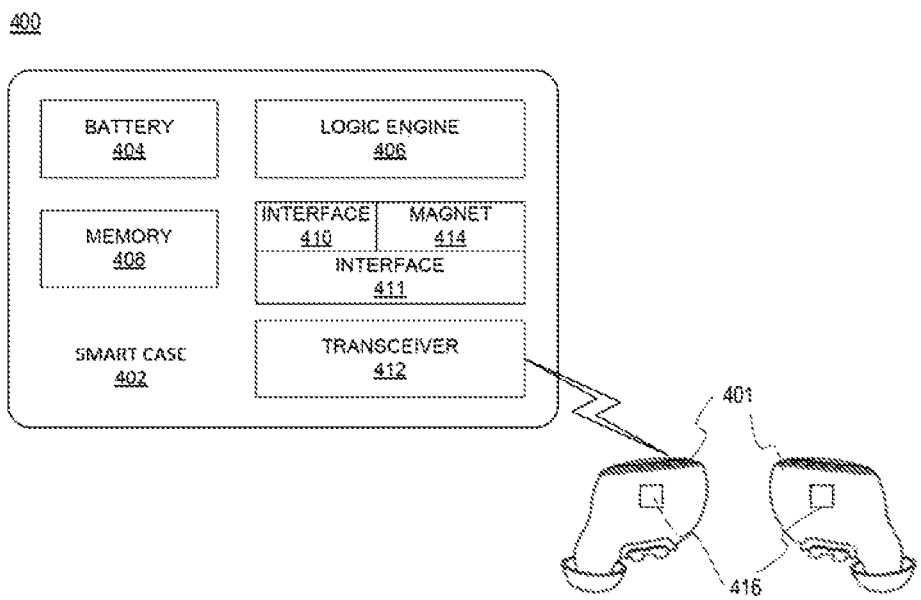
FIG. 4 is a block diagram of a smart case in accordance with an illustrative embodiment.

FIG. 4 is a block diagram of a smart case 402 in accordance with an illustrative embodiment. FIG. 4 shows a wireless environment 400 in which wireless earpieces 401 communicate with and are stored within the smart case 402. The smart case 402 may have any number of configurations and include various circuitry, connections, and other components. The smart case 402 is one potential embodiment of the smart case 102 of FIGS. 1-3.

In one embodiment, the smart case 402 may include a battery 404, a logic engine 406, a memory 408, interfaces 410, 411, a transceiver 412, and a magnet 414. The battery 404 is a power storage device configured to charge the power storage system of the wireless earpieces 401 once or multiple times. In other embodiments, the battery 404 as well as the batteries of the wireless earpieces 401 may represent a fuel cell, thermal electric generator, piezo electric charger, solar charger, ultra-capacitor, or other existing or developing power storage technologies.

In another embodiment, the smart case 402 may include a touch interface or display. The touch interface may indicate the status of the smart case 402. For example, a light may indicate the battery status of the smart case 402 as well as connected wireless earpieces 401, download/synchronization status (e.g., synchronizing, complete, last synchronization, etc.), or other similar information.

The battery 404 may itself be charged through an interface 410. The interface 410 is a hardware interface for connecting the smart case to a power supply or other electronic device. The interfaces 410 may be utilized for charging as well as communications with externally connected devices. For example, the interface 410 may represent a mini-USB, micro-USB or other similar miniature standard connector.

The interface 411 is hardware Interface for connecting and communicating with the wireless earpieces 401. The interface 411 may include any number of pins, arms, or connectors for electrically interfacing with the contacts or other interface components of the wireless earpieces 401. In one embodiment, the interface 411 is a magnetic interface that automatically couples to contacts or an interface of the wireless earpieces 401. In another embodiment, the interface 411 may include a wireless inductor for charging the wireless earpieces 401 without a physical connection.

The logic engine 406 is the logic that controls the operation and functionality of the smart case 402. The logic engine 406 may include circuitry, chips, and other digital logic. The logic engine 406 may also include programs, scripts, and instructions that may be implemented to operate the logic engine 406. The logic engine 406 may represent hardware, software, firmware, or any combination thereof. In one embodiment, the logic engine 406 may include one or more processors, such as microprocessors. The logic engine 406 may also represent an application specific integrated circuit (ASIC) or field programmable gate array (FPGA).

For example, a processor included in the logic engine 406 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, convening and processing signals and information, and performing other related tasks. The processor may also manage transmission and reception of audio and data, GPS information, wireless LAN, GSM, or LTE, SIM or data cards, or so forth. The processor may be a single chip or integrated with other computing or communications elements of the smart case 402.

The memory 408 is a hardware element, device, or recording media configured to store data for subsequent retrieval or access at a later time. The memory 408 may be static or dynamic memory. The memory 408 may include a hard disk, random access memory, quantum computing drive, cache, removable media drive, mass storage, or configuration suitable as storage for data, instructions, and information. In one embodiment, the memory 408 and the logic engine 406 may be integrated. The memory may use any type of volatile or non-volatile storage techniques and mediums. The memory 408 may store information related to the status of the smart case 402 as well as the wireless earpieces 401.

The transceiver 412 is a component comprising both a transmitter and receiver which may be combined and share common circuitry on a single housing. The transceiver 412 may communicate utilizing Bluetooth, Wi-Fi, ZigBee, ANT+, near field communications, wireless USB, infrared, mobile body area networks, ultra-wideband communications, cellular or other suitable radio frequency standards, networks, protocols, or communications. The transceiver 412 may also be a hybrid transceiver that supports a number of different communications. For example, the transceiver 412 may communicate with the wireless earpieces 401 utilizing NFC or various Bluetooth communications, The components of the smart case 402 may be a multi-layer printed circuity board (PCB) electrically connected utilizing any number of wires, contact points, leads, busses, wireless interfaces, or so forth. In addition, the smart case 402 may include any number of computing and communications components, devices or elements which may include busses, motherboards, circuits, ports, interfaces, cards, converters, adapters, connections, transceivers, displays, antennas, and other similar components.

Although not specifically shown, the smart case 402 may communicate with any number of other networks or devices to log information. For example, the smart case 402 may access a portal to store information related to the data acquired by the wireless earpieces 401 and/or smart case 402. The portal may be a web site that functions as a central point, of access to information on the Internet or an intranet. The portal may be accessed from any computing or communications system or device enabled to communicate through a network connection. For example, information accessed by the portal may be stored on a server and an associated database. In another embodiment, the smart case 402 may include a port for receiving a data or communication card (e.g., SIM card, micro SD card, etc.). The data or communications cards may be utilized to store information and may be utilized, for data communications.

The wireless earpieces 401 may include components similar to those shown for the smart case 402 that are miniaturized and compacted to fit within the three dimensional footprint of the wireless earpieces 401. Although not shown, the wireless earpieces 401 may include circuitry for operating the device including a logic engine (e.g., microprocessor), memory, and transceiver all of which are powered by an onboard battery.

In one embodiment, the wireless earpieces 401 may each include a reed switch 416. The reed switch 416 may initiate a low power mode of the wireless earpieces 402 when activated (e.g., opened) by the magnet 414 of the smart case 402. As a result, the wireless earpieces 401 may move to a lower power mode when positioned within the smart case 402. Similarly, the reed switch 416 may initiate a self-power (or high power) mode when deactivated (e.g., closed) by the magnet 414 of the smart case 402. During the low power mode, the wireless earpieces 401 may synchronize data with the memory 408 of the smart, case 402. In addition, the wireless earpieces may perform maintenance of a real-time clock and maintain other essential onboard software programs. The wireless earpieces 401 may also perform hardware and software verification upon mowing to or from a high power mode to ensure proper operation of the wireless earpieces 401. In another embodiment, activation of the reed switch 416 by the magnet 414 may move the wireless earpieces 401 to their lowest power mode during which minimal required functions may be performed software updates, data synchronization, clock updates, etc.). As a result, the wireless earpieces 416 may be fully activated and ready for use when positioned in a user's ears. The reed switch 416 allows precise initiation and deactivation of the onboard battery in order to maintain optimal levels of onboard power.

Figure 5:
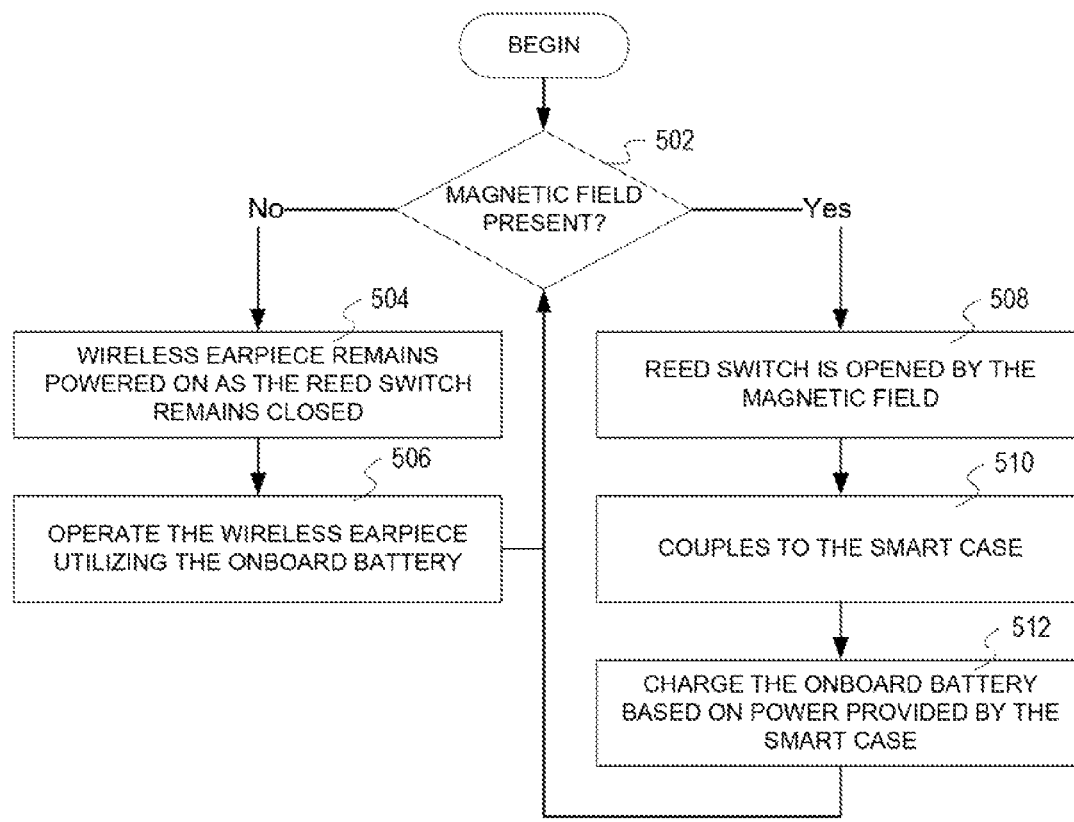
FIG. 5 is a flowchart of a process for utilizing wireless earpieces with a smart case in accordance with an illustrative embodiment.

FIG. 5 is a flowchart of a process for utilizing a wireless earpieces with a smart case in accordance with an illustrative embodiment. In one embodiment, the processes of FIG. 5 may be implemented by one or more wireless earpieces interfacing or coupling with a smart case. The smart case may interact with the wireless earpieces individually or as a unit. In one example, the smart case may only interact with a master earpiece with subsequent control signals and commands relayed by the muster wireless earpiece to the slave or subservient wireless earpiece.

In one embodiment, the process may begin with the wireless earpiece determining whether a magnetic field is present (step 502). In one embodiment, the determination of step 502 may be made based on the interaction of a magnet (or magnetic field) with a reed switch of the wireless earpiece. In another embodiment, logic or a processor may also be utilized to determine if the magnetic field is present. The magnet may be a permanent magnet, electromagnet, temporary, or hybrid magnet.

If the magnetic field is not present, the wireless earpiece remains powered on as the reed switch remains closed (step 504). When the reed switch is closed the onboard battery of the wireless earpiece powers and operates the wireless earpiece to ensure full functionality. In one embodiment, if the wireless earpieces has gone from detecting the magnetic field to not detecting the magnetic field (e.g., wireless earpieces was removed from the smart case), a startup process for the wireless earpiece may be initiated. For example, the battery may power the circuitry of the wireless earpiece executing a boot up program and preparing the wireless earpiece for operation.

Next, the wireless earpiece operates utilizing the onboard battery (step 500). During step 504, the wireless earpiece operates normally with the onboard battery powering the circuitry and components of the wireless earpiece. For example, the wireless earpiece may communicate with another electronic device, such as a cell phone, laptop, gaming device, music player, or so forth, to make calls, play music or sounds, or otherwise interact. The wireless earpiece may continuously determine whether the magnetic field is present.

If the magnetic field is determined to be present in step 502, the reed switch is opened by the magnetic field (step 508). The reed switch is opened automatically based on its nature and configuration when the magnetic field is present. In one embodiment, the wireless earpiece may move to a low power mode in order to preserve battery life when in the reed switch is activated potentially indicating that the wireless earpiece is within the smart case. The wireless earpiece may alternatively enter a reduced power mode, sleep, or other mode. The wireless earpiece may also send a command or communication to the second wireless earpiece to change power mode or otherwise act in response to the reed switch being opened. In one embodiment, by moving the device to a low power mode, the wireless earpiece, the wireless earpiece is prepared to be charged. In another embodiment, the wireless earpieces may enter a low power mode in response to detecting proximity to the smart case before entering a low power mode based on activation of the reed switch by a magnet of the smart case.

Next, the wireless earpiece couples to the smart case (step 510). The coupling of the smart case and the wireless earpiece may be based or contact, proximity, or short-range wireless communications. The wireless earpiece may connect to or link with the smart case utilizing points of contact, male and female connectors, or so forth. For example, magnetic contacts may be utilized between the smart case and wireless earpiece to provide a physical interface. The wireless earpieces may utilize contacts to preserve the waterproof nature of the wireless earpieces. During step 510, communications between the wireless earpiece and smart case may also be initiated. For example, data from the wireless earpiece may be synchronized to the smart case.

In another embodiment, the wireless earpiece may be detected wirelessly. For example, the wireless earpiece may be detected by the smart case utilizing a NFC radio frequency identification tag, or other short range communications signal. In one embodiment, the wireless earpiece may be required to be within a threshold distance (e.g., 10 feet, 10 cm, etc.) to be detected by the smart case. Once the wireless earpiece is proximate the smart case, the smart case may begin to implement any number of actions for the wireless earpiece as well as the smart case. For example, the wireless earpiece may begin a move to a low power mode in anticipation of being coupled to the smart case or may enter a low power mode.

Next, the wireless earpiece charges the onboard battery based on power provided by the smart case (step 512). During step 512, the wireless earpiece may determine whether a charge is required for the wireless earpiece. For example, a charge threshold may be utilized by the battery. If as charge is not required, the wireless earpiece does not receive power from the smart case. In one embodiment, the wireless earpiece may automatically charge the onboard battery in response to determining the battery status is anything less than 95%. The wireless earpiece may also charge the onboard battery in response to a designated time period elapsing, such as two days, to ensure the batteries are fully functional and kept at full capacity. Maintenance of the batteries may be particularly important when being stored after manufacturing, during a sales period, or during extended periods of non-use. Although referred to as batteries, the batteries for each of the wireless earpieces may represent ultra-capacitors, fuel cells, heat pump power generators, or other power storage or generation devices.

In another embodiment, during step 510 or 512 the wireless earpiece may download or synchronize data with the smart case. The data may include biometric information (e.g., pulse rate, oxygenation, distance travelled, calories burned, etc.), exercise information, commands received, and other data logged by sensors (e.g., heart rate monitor, pulse oximeter, accelerometers, gyroscopes, etc.) of the wireless earpiece or otherwise determined. The data may represent user data or data about the performance of the wireless earpieces. In one embodiment, only new data gathered by the wireless earpieces may be synchronized to the smart case. The data may also include medical information, such as blood measurements, voice data (e.g., jitter/shimmer rates temperature, chemical levels (e.g., sodium, glucose, etc.), ambient environment information (e.g., temperature, altitude, barometric readings, speed, etc.) captured audio or video, or so forth.

During any of steps 508-510, the wireless earpiece may enter a power saver or low power mode. During the power saver mode the wireless earpiece may utilize minimal power to maintain functionality and alert status of the wireless earpiece. For example, the wireless earpiece may be configured to communicate with one or more other external devices, such as the smart case, another pair of wireless earpieces, mobile devices, personal computers, routers, or so forth. Location data of the user may be shared with other external, devices and corresponding applications. In the power saver mode the wireless earpiece minimizes power utilization while still exerting full control over the power utilization, charging, and synchronization of the wireless earpieces. The low power mode maintains the earpieces with minimal functionality to charge and synchronize data as well as other designated functions that may be set by user preferences, default, program updates from a central location, or so forth. As a result, the battery of the wireless earpieces may be maintained in an optimal state. In addition, the transition from the low power mode to a high power mode may be implemented upon detecting the wireless earpieces have been removed from the smart case.

The illustrative embodiments are not to be limited to the particular embodiments described herein. In particular, the illustrative embodiments contemplate numerous variations in the type always in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit, and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing wireless earpieces, comprising:
   powering circuitry of the wireless earpieces utilizing a high poser mode in response to detecting a magnetic field is not applied to one or more of the wireless earpieces; and
   altering the power sent to the circuitry of the wireless earpieces to a low power mode in response to detecting a magnetic field is applied to one or more of the wireless earpieces.

2. The method of claim 1, further comprising:
   operating the wireless earpieces utilizing an onboard battery in response to detecting the magnetic field is not applied to one or more of the wireless earpieces.

3. The method of claim 1, further comprising:
charging an onboard battery of the wireless earpieces in response to detecting a magnetic field is applied to the wireless earpieces.

4. The method of claim 1, wherein the magnetic field is applied by a magnet of a smart case configured to receive the wireless earpieces.

5. The method of claim 1, wherein the magnetic field is detected by a reed switch of the wireless earpieces.

6. The method of claim 1, further comprising:
coupling the wireless earpieces to interfaces of a smart case, wherein the smart case applies a magnetic field to one or more of the wireless earpieces.

7. The method of claim 1, wherein the magnetic field is detected by a reed switch integrated in magnetic contacts that interface with a smart case for securing the wireless earpieces.

8. The method of claim 1, further comprising:
synchronizing data between the wireless earpieces and a smart case in response to detecting the magnetic field.

9. The method of claim 1, wherein the low power mode is a power saver mode.

10. A wireless earpiece, comprising:
circuitry operating the wireless earpiece;
a battery powering the circuitry of the wireless earpiece; and
a reed switch connecting the battery to the circuitry, wherein the reed switch connects the circuitry to the battery when a magnetic field is not detected, and wherein the reed switch disconnects the circuitry from the battery when a magnetic field is detected.

11. The wireless earpiece of claim 10, wherein the magnetic field is applied by a smart case configured to receive the wireless earpiece, and wherein the smart case powers the wireless earpiece when received in the smart case.

12. The wireless earpiece of claim 10, further comprising:
magnetic contacts in connection with the circuitry and the battery that interface with a smart case to charge the battery.

13. The wireless earpiece of claim 12, wherein the wireless earpiece synchronizes data with the smart case.

14. The wireless earpiece of claim 10, wherein the wireless earpiece alters a power level of the wireless earpiece in response to the reed switch detecting the magnetic field.

15. The wireless earpiece of claim 10, wherein the wireless earpiece updates software of the wireless earpiece in response to detecting the magnetic field.

16. The wireless earpiece of claim 10, wherein the circuitry includes logic that alters a power state of the wireless earpiece in response to detecting the magnetic field and a startup process in response to not detecting the magnetic field after having detected the magnetic field.

17. A system comprising the wireless earpiece of claim 10, wherein the wireless earpiece is a left earpiece and a smart case for charging the left earpiece, the smart case comprising:
a smart case housing;
a first receptacle for receiving the left earpiece disposed within the smart case housing;
a second receptacle for receiving a right earpiece disposed within the smart case housing;
a first interface associated with the first receptacle for electrically connecting the smart case to the left earpiece;
a second interface associated with the second receptacle for electrically connecting the smart case to the right earpiece;
an intelligent control disposed within the smart case housing and operatively connected to the first interface and the second interface.

18. The system of claim 17 wherein the smart case further comprises a display.

19. The system of claim 18 wherein the display is moveably connected to the smart case to transition from a first position to a second position.

20. The system of claim 19 wherein the smart case further comprises at least one manual input for receiving user input to provide additional functionality.

21. A system comprising:
a first wireless earpiece, comprising:
circuitry operating the first wireless earpiece;
a battery powering the circuitry of the first wireless earpiece; and
a switch connecting the battery to the circuitry, wherein the switch connects the circuitry to the battery when a magnetic field is not detected, and wherein the switch disconnects the circuitry from the battery when a magnetic field is detected;
a smart case for charging the first wireless earpiece and a second wireless earpiece, the smart case comprising:
a smart case housing;
a first receptacle for receiving the first wireless earpiece disposed within the smart case housing;
a second receptacle for receiving the second wireless earpiece disposed within the smart case housing;
a first interface associated with the first receptacle for electrically connecting the smart case to the first earpiece;
a second interface associated with the second receptacle for electrically connecting the smart case to the second earpiece;
an intelligent control disposed within the smart case housing and operatively connected to the first interface and the second interface.

* * * * *

UNITED STATES PATENT AND TRADEMARK OFFICE
CERTIFICATE OF CORRECTION

PATENT NO. : 9,843,853 B2
APPLICATION NO. : 15/245031
DATED : December 12, 2017
INVENTOR(S) : Eric Christian Hirsch and Peter Vincent Boesen It is certified that error appears in the above-identified patent and that said Letters Patent is hereby corrected as shown below:

Claim 1, Line 3, change "poser" to -power-

Signed and Sealed this
Thirteenth Day of March, 2018

Andrei Iancu
*Director of the United States Patent and Trademark Office*

(12) INTER PARTES REVIEW CERTIFICATE (3953rd)

United States Patent
Boesen et al.

(10) Number: US 9,843,853 K1
(45) Certificate Issued: Apr. 17, 2025

(54) POWER CONTROL FOR BATTERY POWERED PERSONAL AREA NETWORK DEVICE SYSTEM AND METHOD

(71) Applicants: Peter Vincent Boesen; Eric Christian Hirsch

(72) Inventors: Peter Vincent Boesen; Eric Christian Hirsch

(73) Assignee: BRAGI GMBH

Trial Number:
IPR2023-01150 filed Jul. 13, 2023

Inter Partes Review Certificate for:
Patent No.: 9,843,853
Issued: Dec. 12, 2017
Appl. No.: 15/245,031
Filed: Aug. 23, 2016

The results of IPR2023-01150 are reflected in this inter partes review certificate under 35 U.S.C. 318(b).

INTER PARTES REVIEW CERTIFICATE
U.S. Patent 9,843,853 K1
Trial No. IPR2023-01150
Certificate Issued Apr. 17, 2025

AS A RESULT OF THE INTER PARTES REVIEW PROCEEDING, IT HAS BEEN DETERMINED THAT:

Claims 1-21 are cancelled.

\* \* \* \* \*